US009711788B2

(12) United States Patent
Nishimura et al.

(10) Patent No.: US 9,711,788 B2
(45) Date of Patent: Jul. 18, 2017

(54) PRIMARY LITHIUM BATTERY

(71) Applicants: FDK CORPORATION, Tokyo (JP); FDK TOTTORI CO., LTD., Tottori (JP)

(72) Inventors: Naoaki Nishimura, Tokyo (JP); Yuki Ochiai, Tokyo (JP); Haruhiko Satake, Tokyo (JP); Nobuhiro Nishiguchi, Tottori (JP)

(73) Assignee: FDK Corporation, Tokyo (JP)

( * ) Notice: Subject to any disclaimer, the term of this patent is extended or adjusted under 35 U.S.C. 154(b) by 0 days.

(21) Appl. No.: 15/022,089

(22) PCT Filed: Sep. 25, 2014

(86) PCT No.: PCT/JP2014/075425
§ 371 (c)(1),
(2) Date: Mar. 15, 2016

(87) PCT Pub. No.: WO2015/046329
PCT Pub. Date: Apr. 2, 2015

(65) Prior Publication Data

US 2016/0226063 A1 Aug. 4, 2016

(30) Foreign Application Priority Data

Sep. 27, 2013 (JP) ................................ 2013-202124

(51) Int. Cl.
*H01M 4/06* (2006.01)
*H01M 4/36* (2006.01)
(Continued)

(52) U.S. Cl.
CPC ............. *H01M 4/366* (2013.01); *H01M 4/06* (2013.01); *H01M 4/382* (2013.01); *H01M 4/405* (2013.01);
(Continued)

(58) Field of Classification Search
CPC ....................................................... H01M 4/06
See application file for complete search history.

(56) References Cited

U.S. PATENT DOCUMENTS 8,062,793 B2 11/2011 Morigaki et al.
8,236,451 B2 8/2012 Sano et al.
(Continued)

FOREIGN PATENT DOCUMENTS

JP 2009-099466 A 5/2009
JP 2009-123549 A 6/2009
(Continued)

OTHER PUBLICATIONS

International Search Report for PCT/JP2014/075425, ISA/JP, mailed Nov. 11, 2014.
(Continued)

*Primary Examiner* — Jacob Marks
(74) *Attorney, Agent, or Firm* — Harness, Dickey & Pierce, P.L.C.

(57) ABSTRACT

A primary lithium battery having an electrode body that is arranged with a sheet-like cathode and a sheet-like anode opposing each other via a separator and sealed inside a jacket body together with a non-aqueous organic electrolyte including the cathode being made by applying or compressively bonding to a surface of a sheet-like current collector cathode material including cathode active material allowing occlusion of lithium ions, and the anode being made by applying anode material including carbon active material allowing occlusion and separation of lithium ions on a one main side face side of a sheet-like current collector having formed holes penetrating from a front to a back, and an anode active material made of a lithium metal or a lithium alloy being affixed to another face side of the current collector.

2 Claims, 3 Drawing Sheets

(51) Int. Cl.

| | |
|---|---|
| ***H01M 6/16*** | (2006.01) |
| ***H01M 4/38*** | (2006.01) |
| ***H01M 4/40*** | (2006.01) |
| ***H01M 4/505*** | (2010.01) |
| ***H01M 4/587*** | (2010.01) |
| ***H01M 6/50*** | (2006.01) |
| ***H01M 4/50*** | (2010.01) |
| *H01M 2/02* | (2006.01) |

(52) U.S. Cl.
CPC ........... *H01M 4/502* (2013.01); *H01M 4/505* (2013.01); *H01M 4/587* (2013.01); *H01M 6/16* (2013.01); *H01M 6/5005* (2013.01); *H01M 2/0217* (2013.01)

(56) References Cited

U.S. PATENT DOCUMENTS

| | | | | |
|---|---|---|---|---|
| 2009/0123844 | A1 | 5/2009 | Morigaki et al. | |
| 2009/0263722 | A1 | 10/2009 | Sano et al. | |
| 2011/0070484 | A1* | 3/2011 | Sano ..................... | H01M 4/502<br>429/188 |

FOREIGN PATENT DOCUMENTS

| | | | |
|---|---|---|---|
| JP | 2009-224102 | A | 10/2009 |
| JP | 2009-266392 | A | 11/2009 |
| JP | 2009-277650 | A | 11/2009 |
| JP | 2010-086733 | A | 4/2010 |
| JP | 2010-086737 | A | 4/2010 |
| JP | 2010-165498 | A | 7/2010 |
| JP | 2011-091034 | A | 5/2011 |
| WO | WO-2006/057110 | A1 | 6/2006 |

OTHER PUBLICATIONS

FDK Corporation, “Lithium battery”, [online], [searched Sep. 7, 2013], Internet URL:http://www.fdk.co.jp/battery/lithium/index.html with English translation thereof.

MarkLines Co., Ltd., ‘Market & Technology “In Europe, eCall, an Automatic Emergency Call Service, will Begin Full-Scale in 2009”’, [online], [searched Sep. 7, 2013], Internet <URL:http//www.marklines.com/ja/report/rep355_200503> with English translation thereof.

Office Action in corresponding Japanese Patent Application 2013-202124, issued Apr. 17, 2017, with English translation thereof.

* cited by examiner

PRIMARY LITHIUM BATTERY

CROSS-REFERENCE TO RELATED APPLICATIONS

This application is a 371 U.S. National Stage of International Application No. PCT/JP2014/075425, filed Sep. 25, 2014, which claims the benefit of and priority to Japanese Patent Application No. 2013-202124, filed Sep. 27, 2013. The entire disclosures of the above applications are incorporated herein by reference.

TECHNICAL FIELD

The present invention relates to a primary lithium battery. Specifically, the present invention relates to improvement technology on discharge characteristics of primary lithium batteries in a low-temperature environment.

BACKGROUND ART

A primary lithium battery is provided with an anode having a lithium metal or a lithium alloy as the anode active material, and a cathode having such as manganese dioxide, copper oxide or graphite fluoride as the cathode active material, and is structured to have an electrode body with the cathode and the anode arranged to oppose each other via a separator and is hermetically sealed inside a jacket body such as cell can together with a non-aqueous organic electrolyte.

A primary lithium battery has a high-energy density as well as a characteristic of being capable of discharging over a long term while allowing a small amount of voltage drop until the last stage of the discharge. And therefore, primary lithium batteries are widely used for the purpose of continuously feeding power for a long term to equipment such as power sources of stationary gas meters and water meters. Additionally, the primary lithium battery has a characteristic of being capable of being stored for a long-term in an unused state. The following NPL 1 relates to the present invention and describes various primary lithium batteries having different operating principles and structures. The following NPL 2 describes a technology related to the field of the present invention.

CITATION LIST

Non Patent Literature

[NPL 1] FDK Corporation, "Lithium battery", [online], [searched Sep. 7, 2013], Internet <URL:http//www.fdk.co.jp/battery/lithium/index.html>

[NPL 2] MarkLines Co., Ltd., 'Market & Technology "In Europe, eCall, an Automatic Emergency Call Service, will Begin Full-Scale in 2009"', [online], [searched Sep. 7, 2013], Internet <URL:http//www.marklines.com/ja/report/rep355_200503>

SUMMARY OF INVENTION

Technical Problem

In the recent years, when some kind of condition is met in an electronical device using a battery as the power source, such as being subject to an external impact, during a long term normal operation, an operation different from the normal operation would take place as an emergency operation which requires carrying of a high current. For example, as in the automatic emergency call service of a vehicle described in above NPL 2, when monitoring of signals from the sensor to detect impacts and the like is performed continuously during a long term normal running condition, and there is met a condition of such as determining an occurrence of an accident which activates an airbag and the like, information such as location information useful for emergency life-savings is sent via a mobile communication network to a predetermined point of contact (such as a police department, a fire station, automobile dealer support center and the like).

As is well known, mobile communication devices such as mobile phones require bulk power, that is, high current when transmitting and receiving voice and data. Furthermore, an emergency notification system is required to certainly operate in any environment where the place of an accident should occur. For example, there may be a case where the system is required to operate at extremely cold places such as regions of high latitudes where the temperature drops to several tens of degrees below zero during the winter season. However, conventional primary lithium batteries are appropriate for power sources operating in normal operating conditions but are not equipped with a feature to discharge high currents in a low-temperature environment.

Additionally, the battery being the power source of the emergency notification system is basically a "single-use" battery. At the time when the system operates, there is a high possibility that the vehicle itself on which the system is mounted is damaged so that the necessity to use a secondary battery which works by repeating charging and discharging is extremely low. Further, secondary batteries are expensive compared to primary batteries. And there is also a need to separately provide a complex electronic circuit such as a charging circuit and a control circuit which prevents over-charging.

Further, the batteries adopted in emergency notification systems require a discharge capacity which can continuously perform the emergency notification operations until a relief party reaches the spot. However, since secondary batteries have small discharge capacities, even secondary lithium batteries having large discharge capacities for a secondary battery have smaller discharge capacities compared to primary lithium batteries. Therefore, there would be many issues when using a secondary battery as the power source of an emergency notification system.

The present invention has been made in view of such circumstances, and an objective thereof is to provide a primary lithium battery which can discharge a high current even in a low-temperature environment.

Solution to Problem

The main invention in order to achieve the foregoing objective is a primary lithium battery having an electrode body that is arranged with a sheet-like cathode and a sheet-like anode opposing each other via a separator and sealed inside a jacket body together with a non-aqueous organic electrolyte including the cathode being made by applying or compressively bonding to a surface of a sheet-like current collector a cathode material including a cathode active material allowing occlusion of lithium ions, and the anode being made by applying an anode material including a carbon active material allowing occlusion and separation of lithium ions on a one main side face side of a sheet-like current collector having formed holes penetrating from a front to a back, and an anode active material made of a lithium metal or a lithium alloy being affixed to another face side of the current collector. Another invention is a primary lithium battery wherein the cathode active material is manganese dioxide.

Advantageous Effects of Invention

According to a primary lithium battery of the present invention, a high current discharge is possible even in a low-temperature environment. The other effects will be made clear in the following description.

DESCRIPTION OF EMBODIMENTS

Figure 1A:
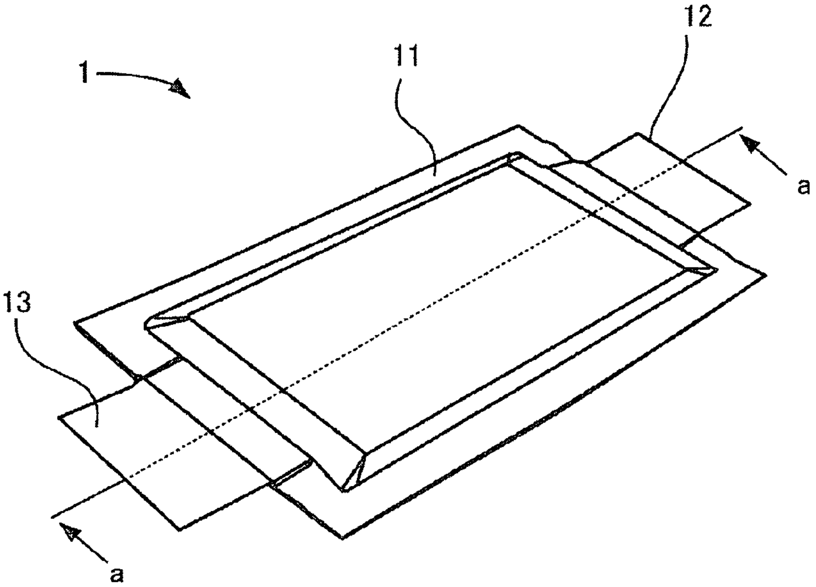
FIG. 1A is a diagram illustrating a structure of a primary lithium battery according to one embodiment of the present invention.

Description of an embodiment of the present invention will be given in the following with reference to the attached drawings. And in the drawings referred in the following description, same reference signs are attached to the same or similar parts and duplicate explanations thereof will be omitted.

Embodiments

Figure 1B:
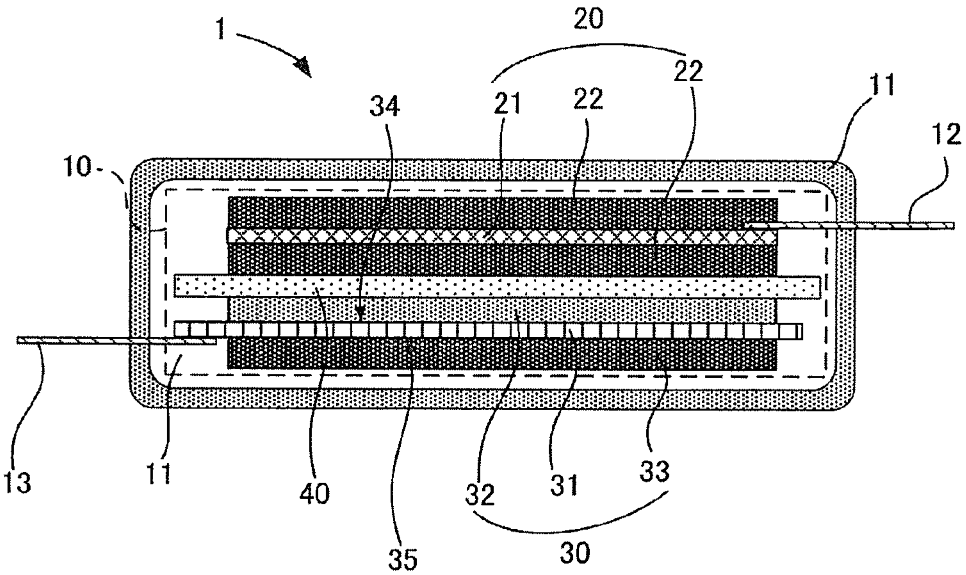
FIG. 1B is a diagram illustrating a structure of a primary lithium battery according to one embodiment of the present invention.

FIGS. 1A and 1B are diagrams illustrating structures of a primary lithium battery 1 according to one embodiment of the present invention. FIG. 1A is a diagram illustrating an external view thereof and FIG. 1B is a diagram illustrating an internal structure thereof schematically indicating a sectional view taken in the direction of arrows a-a in FIG. 1A. The exemplified primary lithium battery 1 illustrated in FIG. 1A has a power generating element including a cathode, an anode and an electrolyte sealed inside a jacket body 11 made of a laminated film, and has a structure (hereinafter, also called completely sealed structure) that is made of a positive terminal plate 12 which is connected to the cathode inside for providing electric power to the external load and a negative terminal plate 13 which is connected to the anode inside for providing electric power to the external load, which are on the outside of the jacket body 11.

As illustrated in FIG. 1B, the jacket body 11 contains therein an electrode body 10 made by arranging a sheet-like cathode 20 oppose a sheet-like anode 30 via a separator 40. In this example, the cathode 20 is made by applying a slurry cathode material 22 on a sheet-like current collector 21 made of a stainless expanded metal. Meanwhile, the anode 30 is structured such that a first main face (referred as the front face) 34 side, of the sheet-like anode current collector 31 made of copper foil with numerous holes formed to penetrate from the surface to the back thereof, has applied an anode material 32 including a carbon material (e.g., hard carbon and also called carbon active material in the following) which allows occlusion and separation of lithium ions, and further has a plate-like lithium metal 33 affixed on the other face (referred as the back face) 35 side. And the electrode body 10 is configured with the anode material 32 side of the anode 30 being arranged to oppose the cathode 20 via the separator 40. Here, the cathode 20 current collector 21 has connected thereto a positive terminal plate 12 and the positive terminal plate 12 is made to extend to the outside of the jacket body 11. Further, the anode 30 current collector 31 has connected thereto the negative terminal plate 13 and a negative terminal plate 13 is made to extend to the outside of the jacket body 11.

In the primary lithium battery with the above described structure, the carbon active material included in the anode material 32 has lithium ions of lithium metal 33 origin separably occluded. Hereby, the carbon active material together with the lithium metal 33 functions as the anode active material to substantially increase the surface area which contributes to the reduction reaction in the anode. And as a result thereof, a high current discharge is allowed even in a low-temperature environment.

===Sample===

In order to confirm the performance of the primary lithium battery 1 according to the above described embodiment, a sample of the primary lithium battery (also referred as the example) 1 having the above described configuration was made. In this way, among various primary lithium batteries, a primary lithium battery of 3.0 volt nominal voltage was obtained with which an outstandingly impact-resistant manganese dioxide lithium battery was made as a sample. The procedure for manufacturing the sample is as follows. Firstly, an electrolytic manganese dioxide (EMD) which becomes the cathode active material, carbon material which becomes the current-carrying material and a fluorinated binder were mixed at a weight percentage ratio of 93:3:4, respectively, and thereafter made into a slurry state using pure water to form the cathode material 22. Then this cathode material 22 was applied and compressively bonded to both faces of the cathode current collector 21 made of expanded metal to make the cathode 20. Further, the positive terminal plate 12 was connected to the cathode current collector 21 such as by welding.

With respect to the anode 30 side, carbon active material allowing occlusion and separation of lithium ions, conductive additives and a binder were mixed at a ratio of 90%, 5% and 5%, respectively, and made into a slurry state as the anode material 32 and this anode material 32 was applied to the front face 34 of the anode current collector 31. Further a plate-like lithium metal 33 was affixed to the back face 35 of the anode current collector 31. Furthermore, the negative terminal plate 13 was connected to the anode current collector 31 by welding and the like. Here, the anode materials 32 including carbon active materials with average particle diameters of 10 μm and 20 μm were respectively prepared and the anode material 32 including carbon active materials with different average particle diameters were applied to the front side 34 of the anode current collector 31 according to the samples.

After vacuum drying the cathode 20 and the anode 30 which were made with the procedure described above, the anode material 32 side of the anode 30 was made to oppose the cathode 20 via a separator 40 made of polyethylene microporous film to be layered and form the electrode body 10. Then the electrode body 10 together with an electrolytic solution were contained inside the jacket body 11 which was made from an aluminum laminated film and had the outer edges of the jacket body 11 sealed with the positive terminal plate 12 and the negative terminal plate 13 in states protruding out from the jacket body 11 to achieve the sample. The electrolytic solution which was used had $LiCF_3SO_4$ as the supporting electrolyte salt dissolved in a non-aqueous solution including ethylene carbonate (EC) and propylene carbonate (PC) being cyclic carbonates, 1,2-dimethoxyethane (DME) being chain ether mixed at a ratio of 20 wt %, 20 wt % and 60 wt %, respectively, so to achieve a concentration of 0.8M.

Further, as samples for comparison with the above mentioned sample of the primary lithium battery 1 according to the present embodiment, there were made primary lithium batteries whose structures and configurations which are similar to the primary lithium battery 1 according to the present embodiment, except that carbon material was not used for the anode and just had a lithium metal affixed on the front side of the sheet-like copper foil used for the anode.

===Characteristics of the Sample===

<High Current Discharge Characteristic>

Figure 2:
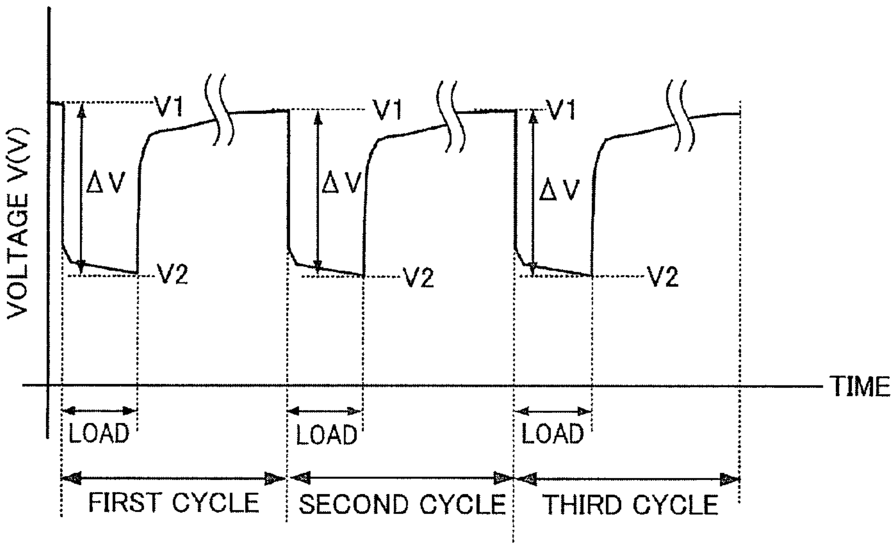
FIG. 2 is a schematic diagram illustrating the way in which a high discharge current characteristic of the primary lithium battery is measured.

Studies on the high current discharge characteristics in a low-temperature environment were conducted on the sample of the primary lithium battery 1 according to the above described embodiment and samples of the primary lithium batteries for comparison by performing low load pulse discharge tests in an environment where the temperature was kept at 20 degrees centigrade below zero. The pulse discharge test was performed by connecting a load to the primary lithium battery 1 according to the present embodiment and the primary lithium batteries according to the samples for comparison and three successive cycles, each cycle operating to include one second of discharge followed by a rest of the discharge for five seconds, were performed with a 100 mA current. And as shown in FIG. 2, the open circuit voltage V1 before applying a load in each cycle and the minimum value V2 of the closed circuit voltage while a load is applied in each cycle were measured so to obtain the test result being the difference $\Delta V=(V1-V2)$.

Figure 3:
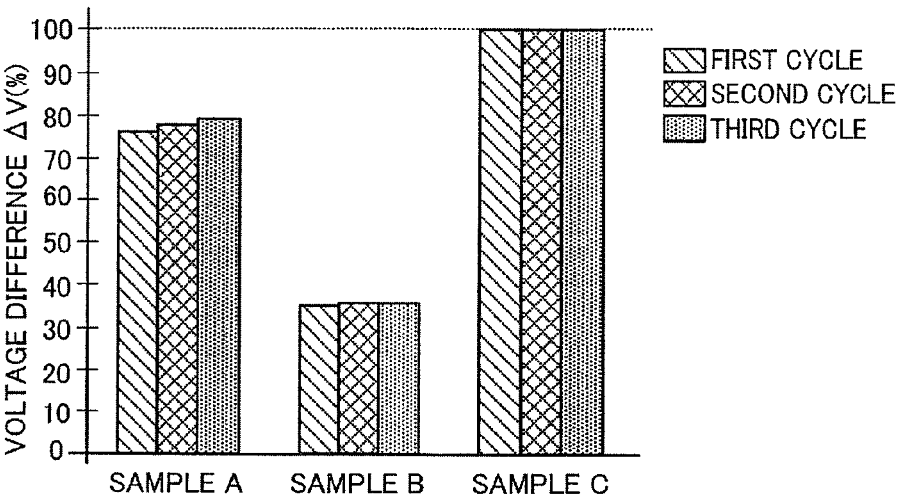
FIG. 3 is a diagram illustrating the high discharge current characteristics of the primary lithium battery according to the above described embodiment and the primary lithium battery according to the comparative example.

FIG. 3 illustrates the results obtained from the pulse discharge test. In this FIG. 3, samples A and B are primary lithium batteries 1 according to the present embodiment where sample A uses carbon active material with an average diameter of 20 μm and sample B uses carbon active material with an average diameter of 10 μm as the anode material 32 of the anode 30. Sample C is the primary lithium battery of the sample for comparison. FIG. 3 illustrates relative values used to indicate the voltage difference ΔV at each cycle of the samples A, B and C respectively with the voltage difference ΔV of the sample for comparison in each cycle set as 100%. And the samples A and B which correspond to the primary lithium battery 1 according to the present embodiment have all the voltage differences ΔV falling below the voltage difference ΔV of the primary lithium battery according to the sample for comparison (sample C). In other words, it was confirmed that a voltage drop would not occur even when a high current discharge is performed in a low-temperature environment. When comparing samples A and B, sample B using carbon active material with a small average particle diameter and a large surface area, was superior to sample A in terms of a high discharge performance in a low-temperature environment.

<Internal Resistance>

Figure 4:
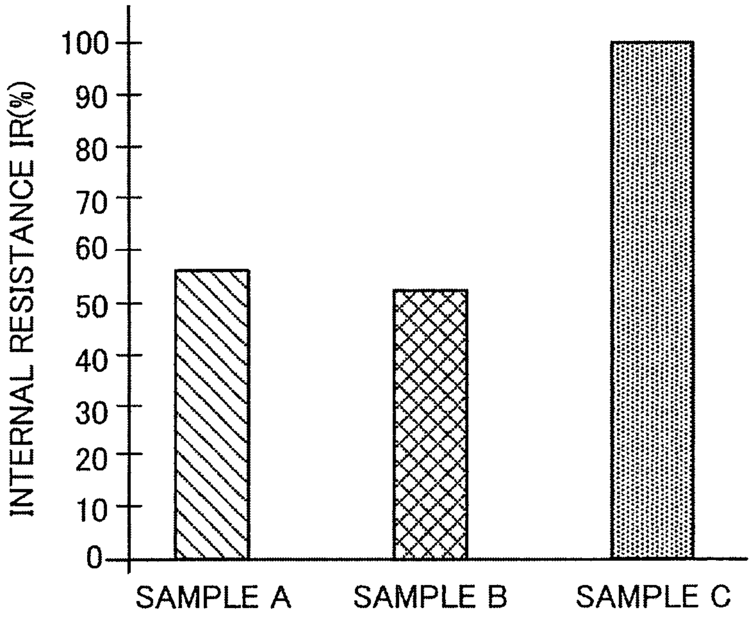
FIG. 4 is a diagram illustrating internal resistances of the primary lithium battery according to the above described embodiment and the primary lithium battery according to a comparative example.

The internal resistances IR in a low-temperature environment of 20 degrees centigrade below zero of each of the samples A to C were measured by the (1 KHz frequency) alternating-current method. FIG. 4 shows the internal resistances IR of each sample. FIG. 4 indicates the internal resistances IR of samples A and B using the relative value with respect to the internal resistance IR of sample C set as 100%. As indicated in the figure, the internal resistances IR of samples A and B being primary lithium batteries 1 according to the present embodiment were not greater than 60% of that of sample C being the primary lithium battery according to the sample for comparison. Further, the internal resistances IR of samples A and B did not differ much but the internal resistance IR of sample B with the anode active material with a small average particle diameter was slightly lower.

From the above results, the primary lithium battery according to the sample for comparison (sample C) having substantially the same configuration as the conventional primary lithium battery apparently showed deterioration in the high current discharge characteristics and increase in the internal resistance due to decline in the drift speed of lithium ions at low-temperature. And the primary lithium battery 1 according to the present embodiment allowed high current discharge at low temperature by compensating the drop in the drift speed of loads (lithium ions) at a low temperature with the amount of lithium ions occluded to the carbon material which is considered to easily allow the lithium ions to be released from the carbon material with a large surface area and also suppress the increase of the internal resistance.

Other Embodiments

It is a matter of course that the present invention is not to be limited to the above described embodiments as long as it is within the gist of the present invention. For example, the types of the cathode active material and the composition of the electrolytic solution can adopt those similar to the conventional primary lithium batteries. The structure of the primary lithium battery is also not limited to the above described completely sealed type and may be a well known coin type, inside out type, spiral type and the like where the jacket body also serves as the electrode terminals. An appropriate structure or configuration may be adopted according to use. It will do as long as there is arranged a carbon material allowing occlusion and separation of lithium ions on one face of the electrode body with holes penetrating from the surface to the back thereof, and there is included an anode structure having a lithium metal or a lithium alloy being the source of lithium ions arranged on the other face.

INDUSTRIAL APPLICABILITY

The present invention is appropriate as, for example, a power source of an emergency notification system and the like of vehicles.

REFERENCE SIGNS LIST 1 primary lithium battery, 10 electrode body, 11 jacket body, 12 positive terminal plate, 13 negative terminal plate, 20 cathode, 21 cathode current collector, 22 cathode material, 30 anode, 31 anode current collector, 32 anode material, 33 lithium metal, 40 separator

The invention claimed is:

1. A primary lithium battery comprising:

an electrode body configured to have arranged a sheet-like cathode and a sheet-like anode opposing each other with a separator interposed therebetween; and a jacket body configured to seal therein the electrode body together with a non-aqueous organic electrolyte, wherein the cathode is made by applying or compressively bonding to a surface of a sheet-like current collector body a cathode material including a cathode active material allowing occlusion of lithium ions; and the anode is made by applying an anode material including a carbon active material allowing occlusion and separation of lithium ions on a one main side face side of a sheet-like current collector body having formed holes penetrating from a front to a back, and an anode active material made of a lithium metal or a lithium alloy being affixed to another face side of the current collector body.

2. A primary lithium battery according to claim 1, wherein the cathode active material is manganese dioxide.

* * * * *

UNITED STATES PATENT AND TRADEMARK OFFICE

CERTIFICATE OF CORRECTION

PATENT NO. : 9,711,788 B2
APPLICATION NO. : 15/022089
DATED : July 18, 2017
INVENTOR(S) : Naoaki Nishimura et al.

It is certified that error appears in the above-identified patent and that said Letters Patent is hereby corrected as shown below:

In the Claims

Column 7,
Line 6 (Claim 1), after "ions" delete ";".
Line 15 (Claim 2), "A" should be --The--.

Signed and Sealed this
Twenty-third Day of January, 2018

Joseph Matal

Joseph Matal
*Performing the Functions and Duties of the*
*Under Secretary of Commerce for Intellectual Property and*
*Director of the United States Patent and Trademark Office*